(12) United States Patent
Shahin

(10) Patent No.: US 12,529,402 B2
(45) Date of Patent: Jan. 20, 2026

(54) BRAKE PAD ASSEMBLY FOR A DISK BRAKE SYSTEM AND DISK BRAKE SYSTEM

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek Si (KR)

( * ) Notice: Subject to any disclaimer, the term of this patent is extended or adjusted under 35 U.S.C. 154(b) by 389 days.

(21) Appl. No.: 18/070,813

(22) Filed: Nov. 29, 2022

(65) Prior Publication Data

US 2023/0167865 A1 Jun. 1, 2023

(30) Foreign Application Priority Data

Nov. 29, 2021 (DE) .......................... 102021213423.8

(51) Int. Cl.
*F16D 65/097* (2006.01)
*B32B 3/30* (2006.01)
(Continued)

(52) U.S. Cl.
CPC ............ *F16D 65/0971* (2013.01); *B32B 3/30* (2013.01); *B32B 15/043* (2013.01); *B32B 15/06* (2013.01);
(Continued)

(58) Field of Classification Search
CPC .... F16D 65/0971; F16D 65/18; F16D 55/226; F16D 2200/0021; F16D 2200/0026;
(Continued)

(56) References Cited

U.S. PATENT DOCUMENTS 4,240,530 A * 12/1980 Tillenburg ............ F16D 65/092
188/264 G
4,685,543 A * 8/1987 Ziolkowski ......... F16D 65/0006
188/264 G
(Continued)

FOREIGN PATENT DOCUMENTS

DE 19706122 A1 8/1998
DE 69817733 T2 4/2004
(Continued)

OTHER PUBLICATIONS

Office Action issued in corresponding German Patent Application No. 10 2021 213 423.8 dated Jul. 19, 2022.
(Continued)

*Primary Examiner* — Christopher P Schwartz
(74) *Attorney, Agent, or Firm* — LEE, HONG, DEGERMAN, KANG & WAIMEY

(57) ABSTRACT

The application relates to a brake pad assembly for a disk brake system and to a disk brake system. The proposed brake pad assembly for a disk brake system comprises a back plate having a front side for facing a brake disk of the disk brake system and a back side. The brake pad assembly further comprises a friction layer arranged at the front side of the back plate for contacting a friction surface the brake disk. The back plate comprises a back plate body having a recess on its back side. The back plate further comprises a layered structure that is received within the recess of the back plate body. The layered structure comprises a copper layer and a rubber layer. The rubber layer covers the copper layer.

13 Claims, 8 Drawing Sheets

Figure 1:
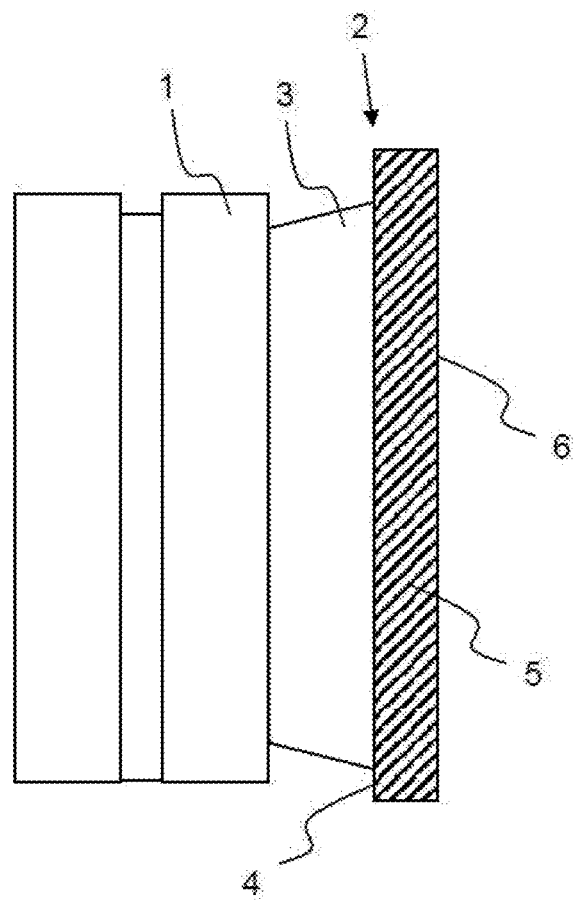

(51) Int. Cl.
*B32B 15/04* (2006.01)
*B32B 15/06* (2006.01)
*B32B 15/18* (2006.01)
*B32B 15/20* (2006.01)
*F16D 55/226* (2006.01)
*F16D 65/18* (2006.01)

(52) U.S. Cl.
CPC .............. *B32B 15/18* (2013.01); *B32B 15/20* (2013.01); *F16D 55/226* (2013.01); *F16D 65/18* (2013.01); *B32B 2307/744* (2013.01); *B32B 2605/00* (2013.01); *F16D 2200/0021* (2013.01); *F16D 2200/0026* (2013.01); *F16D 2250/0007* (2013.01)

(58) Field of Classification Search
CPC ... F16D 2250/0007; B32B 3/30; B32B 15/06; B32B 15/18; B32B 15/20; B32B 2307/744
USPC .............................. 188/250 C, 250 B, 250 G
See application file for complete search history.

(56) References Cited

U.S. PATENT DOCUMENTS

| | | | |
|---|---|---|---|
| 5,762,166 A * | 6/1998 | Yano | F16D 65/0006 188/264 G |
| 6,213,257 B1 | 4/2001 | Yano et al. | |
| 6,481,545 B1 * | 11/2002 | Yano | B32B 15/06 188/264 G |
| 8,869,955 B2 * | 10/2014 | Parild | F16D 65/0971 188/251 A |
| 11,976,700 B2 * | 5/2024 | Shahin | F16D 65/0006 |
| 2002/0189910 A1 | 12/2002 | Yano et al. | |
| 2004/0222055 A1 | 11/2004 | Niwa et al. | |
| 2013/0277159 A1 * | 10/2013 | Borgmeier | F16D 65/095 188/234 |
| 2023/0141199 A1 * | 5/2023 | Shahin | F16D 65/0006 188/73.38 |
| 2023/0265899 A1 * | 8/2023 | Shahin | F16D 65/092 188/73.38 |

FOREIGN PATENT DOCUMENTS

| | | |
|---|---|---|
| DE | 102012023012 | 6/2014 |
| DE | 102015104035 B3 | 5/2016 |
| DE | 102018116304 A1 | 1/2020 |
| DE | 102018216346 A1 | 3/2020 |
| JP | H11141581 A | 5/1999 |
| KR | 100430514 | 7/2004 |
| KR | 10-2004-0086578 A | 10/2004 |
| KR | 10-0811786 B1 | 3/2008 |

OTHER PUBLICATIONS

Deutsches Patent- und Markenamt Application No. 102021213423.8, Office Action dated Jun. 18, 2024, 17 pages.
Korean Intellectual Property Office Application No. 10-2022-0157593, Notice of Allowance dated September 2, 2025, 5 pages.

* cited by examiner

BRAKE PAD ASSEMBLY FOR A DISK BRAKE SYSTEM AND DISK BRAKE SYSTEM

CROSS-REFERENCE TO RELATED APPLICATIONS

Pursuant to 35 U.S.C. § 119(a), this application claims the benefit of earlier filing date and right of priority to German Patent Application No. 102021213423.8, filed on Nov. 29, 2021, the contents of which are hereby incorporated by reference herein in its entirety.

The application relates to a brake pad assembly for a disk brake system and to a disk brake system.

Brake Engineers are in search for robust solutions to suppress squeal noises (tonal loud noises typically appearing in frequencies between 1000 and 16000 Hz) in disk brake systems. Different solutions are known to improve the noise, vibration, and harshness (NVH) characteristics, including a steel shim glued to a back side of a back plate of a brake pad assembly, different chamfers on a pad of the brake pad assembly, slots on pad surfaces contacting the disk, modifications of friction material of the brake pads, and an underlayer connecting the friction material to the back plate. The main effect of the shim is to decouple system modes from each other. While these solutions can help improve the squeal noise characteristics, in most cases these solutions work well only under specific braking conditions (low or high frequency, cold or warm temperature). Prior art can be found, e.g., in document DE 197 06 122 A1.

In view of the above-mentioned aspects, it is an object of the present invention to provide an improved brake pad assembly for a disk brake system. In particular, it is an object of the application to provide a compact and robust brake pad assembly, which reliably suppresses squeal noises over a wide range of braking conditions. In addition, it is an object of the application to provide an improved disk brake system having these advantages.

This objective is achieved by a brake pad assembly for a disk brake system comprising the features of claim 1 and by a disk brake system having the features of another claim. Optional further features and further developments will become apparent from the dependent claims and the detailed description in conjunction with the accompanying figures.

The proposed brake pad assembly for a disk brake system comprises a back plate having a front side for facing a brake disk of the disk brake system and a back side. The brake pad assembly further comprises a friction layer arranged at the front side of the back plate for contacting a friction surface the brake disk. The back plate comprises a back plate body having a recess on its back side. The back plate further comprises a layered structure that is received within the recess of the back plate body. The layered structure comprises a copper layer and a rubber layer. The rubber layer covers the copper layer.

By providing the recess and the layered structure, noise generated during use of the disk brake system can be reduced. In particular, the proposed brake pad assembly improves the reduction of squeal noises. The layered structure in the recess of the back plate body improves the dynamic behavior of the disk brake system to reduce the squeal noises, e.g., at hot temperatures. The layered structure in the recess may improve a global damping characteristic and reduce a sound pressure level among a wide frequency range by decoupling the vibrational modes in the normal, radial, and tangential directions, while using beneficial material damping properties of copper. The proposed brake pad assembly further enables a particularly compact and space-saving arrangement, in particular when no additional shim is used. In this way, a width of a caliper bridge of the disk brake system may be reduced to enable a compact arrangement of the disk brake system.

The application further relates to a disk brake system comprising a brake piston and/or a caliper finger. The disk brake system further comprises the brake pad assembly as described above or below. The back side of the back plate may contain a pressure region, which is configured to be pushed on by the brake piston or by the caliper finger upon brake application. In some embodiments, the disk brake system does not have a shim, e.g., a clip-on shim, arranged between the back plate of the brake pad assembly and the brake piston or the caliper finger. Further, in some embodiments, the brake piston and/or the caliper finger is configured to push directly onto the back plate. For example, the pressure region of the back side of the back plate may be a region of direct contact with the brake piston or with the caliper finger. The brake piston is typically movably coupled to the caliper finger to generate a braking motion of the brake pad assembly toward the brake disk. In particular, the disk brake system may comprise another brake pad assembly having the features of the brake pad assembly described above or below. The brake pad assembly and the other brake pad assembly may each be mounted between the brake disk and one of the piston and the brake disk and the caliper finger.

In some embodiments, the rubber layer is arranged directly on a back side of the copper layer. The rubber layer may be adhered to the copper layer. The rubber layer and the copper layer may each form flat layers. The rubber layer and the copper layer may be oriented essentially in parallel on top of one another. The rubber layer may cover the copper layer completely.

To further improve the noise damping characteristics and to provide an improved contact with the brake piston and/or caliper finger, the layered structure may form a part of the back side of the back plate. In particular, the rubber layer may form a part of the back side of the back plate. For example, the brake piston and/or the caliper finger may be configured to be in direct contact with the rubber layer of the layered structure. For example, the layered structure may be arranged such that the brake piston and/or caliper finger is configured to push directly onto a back side of the layered structure, for example directly onto a back side of the rubber layer, upon brake application.

In typical embodiments, the back plate body is made of steel. In this way, the back plate may provide an improved structural stability of the brake pad assembly, while enabling beneficial noise damping characteristics. A thickness of the back plate body may be at least 3 mm and/or at most 8 mm, for example 5 mm. The thickness of the back plate body may be defined by a region of the back plate body that is not the region of the recess.

To improve the noise damping properties further while maintaining a compact arrangement of the brake pad assembly, the copper layer may have a thickness of at least 0.5 mm, in particular at least 1 mm, and/or at most 4 mm, in particular at most 2.5 mm. Further, the rubber layer may have a thickness of at least 0.1 mm, in particular at least 0.5 mm, and/or at most 5 mm, in particular at most 3 mm. The copper layer and/or the rubber layer and/or the entire layered structure may be fully received within the recess of the back plate body. For example, the layered structure may not protrude beyond the back side of the back plate body in some embodiments. Typically, a back side of the layered structure, which may be formed by the rubber layer, is flush with the back side of the back plate body. In this manner, a particularly compact arrangement may be achieved. For efficient noise cancellation, the layered structure and/or the copper layer and/or the rubber layer may have a surface area of at least 5 cm$^2$, in particular at least 10 cm$^2$, and/or at most 100 cm$^2$, in particular at most 50 cm$^2$, in some embodiments.

The copper layer may be in direct contact with the back plate body in some embodiments. For example, the copper layer may be in direct contact with side surfaces and/or with a bottom surface of the recess of the back plate body. In this way, a dampening effect of the layered structure may be improved. The copper layer may be connected with the back plate body, in particular with the side surfaces and/or with the bottom surface, by material boding, e.g., by direct material bonding between the copper of the copper layer and the material of the back plate body. For example, the copper layer of the layered structure may be cast into the recess of the back plate body. In other embodiments, however, the copper layer may be glued and/or inserted into the recess of the back plate body.

According to different embodiments, the layered structure may be arranged at least partly in the pressure region of the back side of the back plate, have an overlap with the pressure region, be fully arranged within the pressure region, and/or be fully or partly arranged next to the pressure region. To further improve the noise dampening characteristics, the layered structure may be inserted at the positions of the back plate that have higher pressure amplitudes in real load situations. For example, the layered structure may be arranged at least partly between the pressure region of the back side of the back plate and a top edge of the back side of the back plate. Additionally or alternatively, the layered structure may be arranged at least partly between the pressure region of the back side of the back plate and at least one of a first side edge and a second side edge of the back side of the back plate. In this manner, the noise reduction properties of the back plate may be further improved. For example, the layered structure may be arranged at least partly, in particular fully, in a region of force transmission between the pressure region of the back side of the back plate, which is configured to be pushed on by a brake piston or by a caliper finger upon brake application, and an edge, in particular a top edge and/or a side edge, of the back side of the back plate. An edge surface of the back surface of the back plate is typically delimited by one of the top edge and the first and second side edges of the back surface of the back plate. By providing the arrangement of the layered structure in the region of force transmission, the noise reduction may be improved by providing a more homogeneous force distribution upon brake application. In some embodiments, the layered structure is in its entirety arranged between the pressure region of the back side of the back plate and the top edge of the back side of the back plate and/or between the pressure region of the back side of the back plate and at least one of the first side edge and the second side edge of the back side of the back plate.

Typically, the top edge of the back surface of the back plate delimits the back plate in a radial direction as defined with respect to the brake disk. The layered structure may at least partly be arranged in a radial direction of, e.g., above, the pressure region, in particular toward the top edge of the back side of the back plate. In this manner, force transmission upon brake application toward the top edge may be efficiently suppressed to enable a more homogeneous pressure distribution and to improve noise reduction. The first side edge and the second side edge typically delimit the back side of the back plate in leading and trailing tangential directions, respectively. By providing this arrangement, the brake pad assembly achieves a higher damping effect based on controlled acoustic wave transmission within a body and structure of the brake pad assembly and also reduces transmission of acoustic waves from the structure to the surroundings through airborne sound.

By means of the described arrangement of the layered structure, a sound path may be controlled and high pressure amplitudes can be reduced. Beneficially, the arrangement of the layered structure supports structural noise to be damped and squeal sound energy to be dissipated. Further, the arrangement of the layered structure is suitable to improve a homogenous distribution of force flow lines starting from the pressure region to the edges and other connection areas and thereby achieves a more homogeneous pressure distribution enabling an improved noise reduction. In realistic brake scenarios, the force transmission upon brake application tends to be from the pressure region toward the top and first and second side edges of the back plate due to tangential pressure components.

The back plate body may comprise another recess on its back side. The back plate may further comprise another layered structure that is received within the other recess of the back plate body. The other recess and/or the other layered structure may comprise any or all of the features described above or below with regard to the recess and the layered structure, respectively. In particular, the other layered structure may comprise a copper layer and a rubber layer covering the copper layer. The layered structure and the other layered structure may each be arranged at least partly, in particular fully, in a region of force transmission between the pressure region of the back side of the back plate, which is configured to be pushed on by a brake piston or by a caliper finger upon brake application, and an edge of the back side of the back plate. In this manner, a more homogeneous force distribution is achieved and noise can be more efficiently reduced. For example, the layered structures may each be arranged at least in parts, in particular fully, between the pressure region of the back side of the back plate and one of the first side edge of the back side of the back plate as well as the second side edge of the back plate. In this manner, the layered structures may contribute to suppress force transmission from the pressure region toward the side edges to enable a more homogeneous pressure distribution and an improved noise reduction.

The pressure region may have a curved upper edge. The circular upper edge of the pressure region may result from a ring-shaped piston surface. In other embodiments, the pressure region of the back side of the back plate is configured to be pushed on by the caliper finger upon brake application. The layered structure may be arranged between this pressure region and the top edge of the back side of the back plate, while the other layered structure may be arranged between this pressure region and at least one of the first side edge and the second side edge. In this manner, force transmission may be improved for the case of the caliper finger pushing onto the brake pad assembly for improved noise reduction. In this case, the pressure region typically comprises a left pressure region and a right pressure region, which are separate from one another. The pressure regions are typically a result of the shape of the caliper finger having left and right finger faces. Typically, the layered structure is arranged between the left pressure region and the first side edge and/or between the left pressure region and the top edge. The other layered structure may be arranged between the right pressure region and the second edge and/or between the right pressure region and the top edge for improved noise reduction properties on the caliper finger side. There may be further layered structures provided and arranged in the regions as described above and below.

In some embodiments, the copper layer has an enlarged thickness in a pressure region of the back side of the back plate that is configured to be pushed on by a brake piston or by a caliper finger. The copper layer may be thinner in regions other than the pressure region. In this way, the noise dampening and stability characteristics of the brake pad assembly may be further improved.

In most embodiments, the copper layer has a copper content of at least 30% by weight to improve the noise damping characteristics. The copper layer may contain a copper alloy, such as bronze or brass, e.g., copper aluminium, copper zinc, copper tin or copper silicon. In other embodiments, the copper layer may be made of essentially pure copper.

Exemplary embodiments will be described in conjunction with the following figures.

Figure 2:
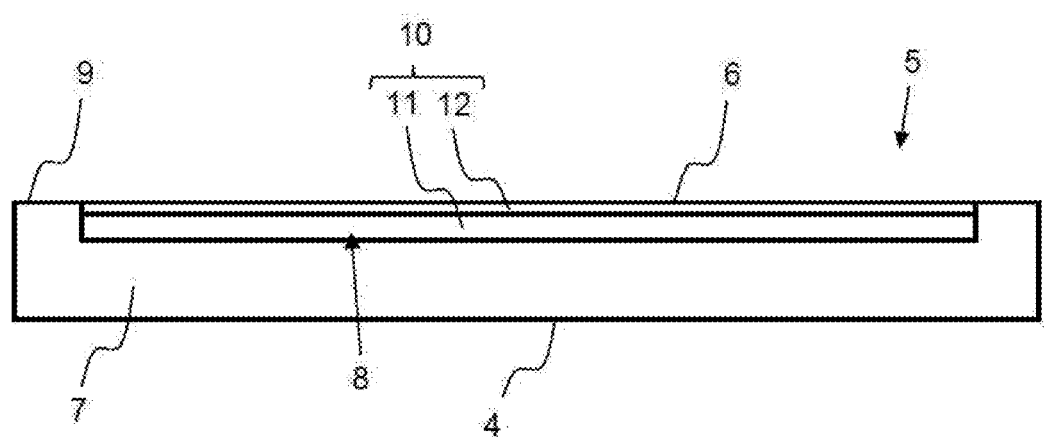
Figure 3:
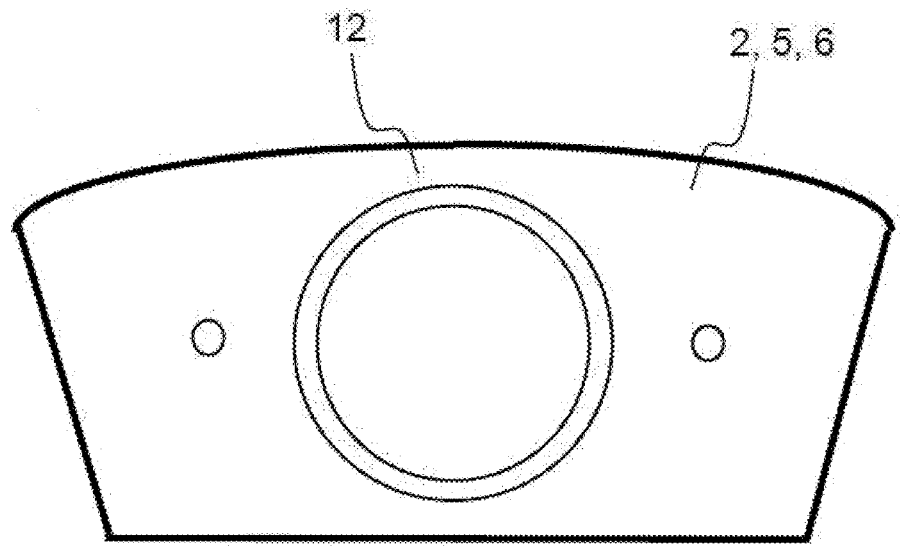
Figure 6:
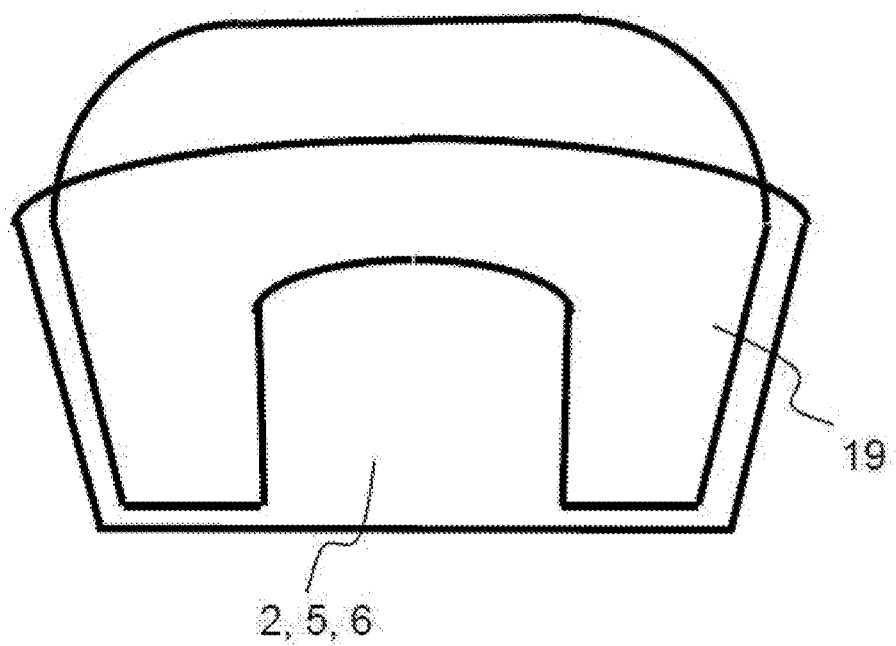
Figure 7:
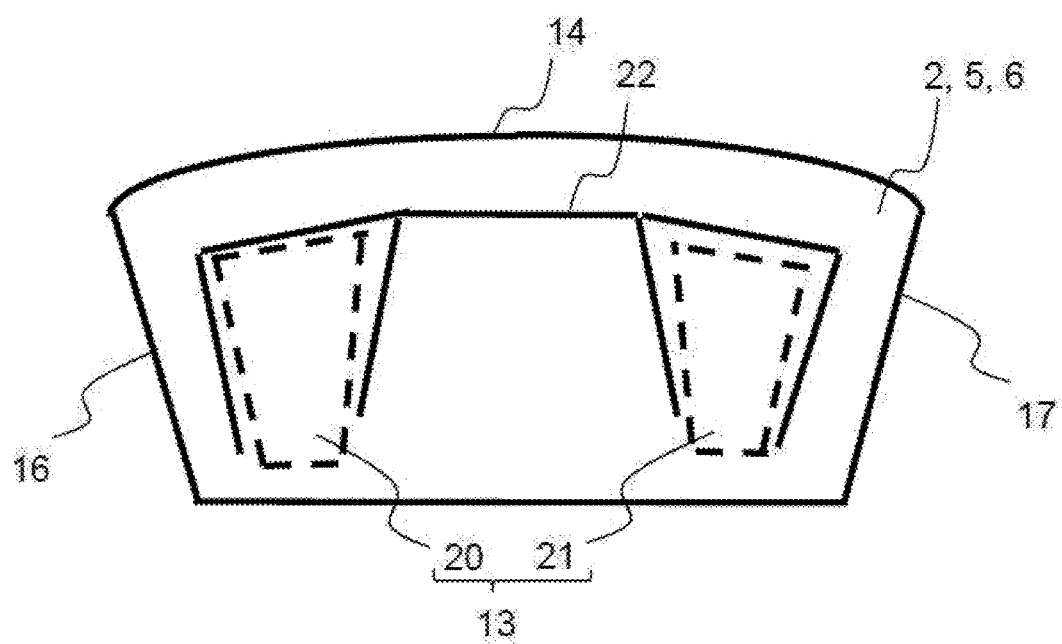
Figure 8:
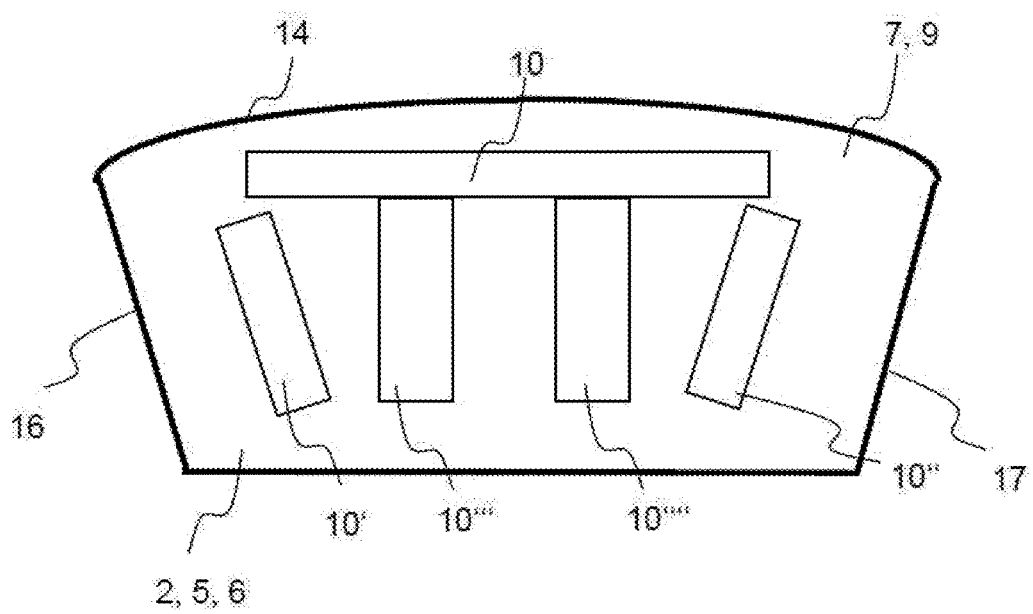

FIG. 1 shows a schematic cross sectional illustration of a brake pad assembly and a brake disk, FIG. 2 shows a schematic cross-sectional view of a back plate of the brake pad assembly, FIGS. 3) to 5 show schematic views of a piston and the brake pad assembly, and FIGS. 6 to 8 show schematic views of a caliper finger and a brake pad assembly according to another embodiment.

FIG. 1 shows a brake disk 1 of a of a disk brake system for a vehicle. The disk brake system may comprise a caliper housing, a caliper finger and a brake piston. The disk brake system further comprises a brake pad assembly 2, which may be attached to the caliper finger and/or to the brake piston. The brake pad assembly 2 has a friction layer 3, which is pushed against a friction surface of the brake disk 1 upon hydraulic or electric actuation of the disk brake system. The friction layer 3 contains a material that shows a good stopping performance and heat transfer when engaging with the brake disk 1. The friction layer 3 is attached to a front side 4 of a back plate 5, which provides structural stability to the brake pad assembly 2. The brake piston or the caliper finger is configured to push against a back side 6 of the back plate 5 to push the friction layer 3 against the brake disk 1. In most embodiments, the back plate 5 is made of a metal, in particular steel. A thickness of the back plate 5 may be, e.g., 5 mm. The friction layer 3 can have a thickness of at least 8 mm and/or at most 15 mm, for example. The material of the friction layer 3 can for instance comprise at least one of copper, iron sulphide, graphite, zinc powder, basalt, calcium carbonate, tin sulphide, zinc aluminium, phenolic resin, rubber dust and mineral fiber. These materials show good stopping performance and heat transfer when engaging with the brake disk.

FIG. 2 shows the back plate 5 in more detail. Corresponding and reoccurring features shown in the different figures are denoted using the same reference numerals. The back plate 5 comprises a back plate body 7. The back plate body 7 has a recess 8 on a back side 9 of the back plate body 7 and a flat front side forming the front side 4 of the back plate 5. The back plate 5 further comprises a layered structure 10 having a copper layer 11 and a rubber layer 12 arranged on and attached to a back side of the copper layer 11. The layered structure is received within the recess 8 on the back side 9 of the back plate body 7 and essentially fills the recess 8 completely. A back side of the layered structure 10 is formed by the rubber layer 12, which is flush with the back side 9 of the back plate body 7 such that the back plate body 7 and the layered structure 10 form the back side 6 of the back plate 5. The back side 6 of the back plate 5 is a flat surface that does not have any steps. The copper layer 11 may be cast into the back plate body 7 and may be directly attached to a bottom surface as well as to side surfaces of the recess 8 by material bonding to the back plate body 7 in some embodiments.

Figure 4:
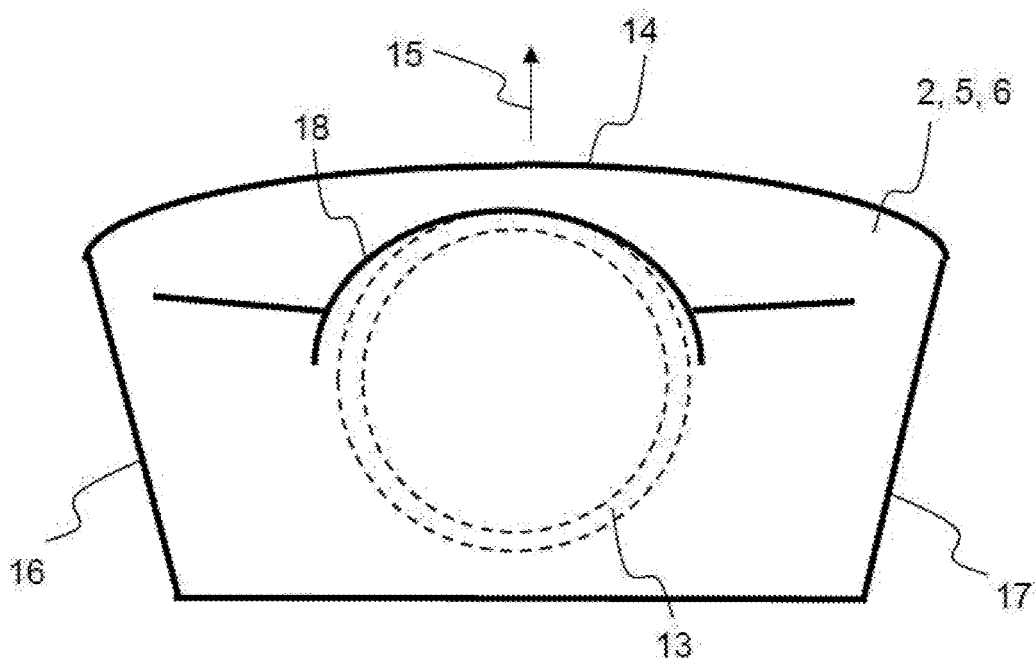

FIG. 3 shows the brake pad assembly 2 and the brake piston 19 of the disk brake system as viewed from the back, i.e., toward the brake disk 1. The brake piston 19 is configured to push against the back side 6 of the back plate 5. The brake piston 19 has a ring-shaped front surface, which leads to a ring-shaped pressure region 13, see FIG. 4, i.e., a ring-shaped region of the back side 6 of the back plate 5 that is exposed to an axial pressure exerted by the brake piston 19. FIG. 4 does not show the brake piston 19. The back side 6 of the back plate 5 has a top edge 14, which delimits the back plate 5 in the upward direction. The upward direction is a radial direction 15. According to the depiction of the figures, the axis of rotation (not shown) of the brake disk 1 would be arranged below the brake pad assembly 2, i.e., toward the bottom in the figures (in a direction opposite the radial direction 15). The back side 6 of the back plate 5 further has a first side edge 16, which is a leading edge on the left in the figures, and a second side edge 17, which is a trailing edge on the right. The top and side edges 14, 16, 17 delimit edge surfaces of the back plate.

Figure 5:
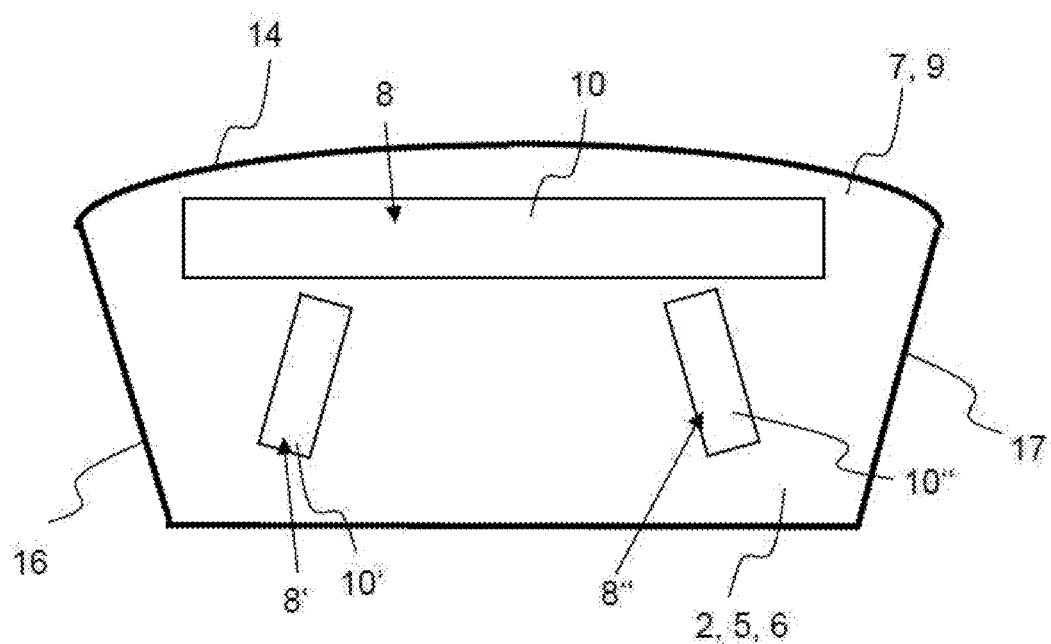

FIG. 4 further illustrates suitable regions for the layered structure 10 or layered structures, as shown in FIG. 5. The suitable regions are regions of force transmission from the pressure region 13 to the top and side edges 14, 16, 17 in real case situations. These regions are indicated by the lines 18 in FIG. 4. As depicted in FIG. 5 the layered structure 10 is arranged roughly in the region indicated by the line 18 of FIG. 4. The layered structure 10 is arranged in the recess 8 of the back plate body 7 and is further arranged in parts between the pressure region 13 and the top edge 14 of the back side 6 of the back plate 5. In the example shown, the layered structure 10 is arranged such that it has an overlap with the pressure region 13. Therefore, upon application of the brake, the brake piston 19 pushes directly onto the rubber layer 12 of the layered structure 10. The copper layer 11 of the layered structure 10 may have an increased thickness in a region that overlaps with the pressure region 13 as compared with a region that does not overlap with the pressure region 13.

The back plate body 7 further comprises another recess 8' and a further recess 8''. Another layered structure 10' and a further layered structure 10'' are each arranged in one of the other and further recesses 8, 8'. The other and further layered structures 10', 10'' have the features of the layered structure 10 described above. The other layered structure 10' is arranged between the pressure region 13 and the left edge 16, while the further layered structure 10'' is arranged between the pressure region 13 and the right edge 17 for improved noise dampening.

In another embodiment, the brake pad assembly 2 may be intended to be arranged on a caliper finger side of the brake system. As shown in FIG. 6, the brake system may comprise the caliper finger 19' (as viewed from the back, i.e., toward the brake disk 1, in the figure). The caliper finger 19' is configured to push against a back side 6 of the back plate 5 when the brake is applied. The caliper finger 19' is shown to exert axial pressure on the brake pad assembly 2 in the pressure region 13, which in this case comprises a left pressure region 20 and a right pressure region 21, as shown in FIG. 7. Lines denoted by reference sign 22 indicate the preferred positions of the layered structures for noise reduction.

As shown in FIG. 8 and similar to the case described for the brake piston side with regard to FIGS. 3 to 5, the layered structure 10 is arranged between the pressure region 13 (having the separate left and right regions 20, 21) and the top edge 14 of the back plate 5, the other layered structure 10' is arranged between the left pressure region 20 and the left edge 16, and the further layered structure 10" is arranged between the right pressure region 21 and the right edge 17. Additional layered structures 10''', 10'''' are arranged between the left pressure region 20 and the right pressure region 21. The layered structures 10, 10', 10", 10''', 10'''' are held within respective recesses arranged on the back side 9 of the back plate body 7. There can be an overlap between the pressure region 13, 20, 21 and some or all of the layered structures 10, 10', 10", 10''', 10'''' in some embodiments such that the caliper finger 19' pushes directly on the rubber layers of the layered structure.

Features of the different embodiments which are merely disclosed in the exemplary embodiments may be combined with one another and may also be claimed individually.

The invention claimed is:

1. A brake pad assembly for a disk brake system, comprising
  a back plate having a front side for facing a brake disk of the disk brake system and a back side, and further comprising
  a friction layer arranged at the front side of the back plate for contacting a friction surface the brake disk,
  wherein the back plate comprises a back plate body having a recess on its back side,
  wherein the back plate further comprises a layered structure that is received within the recess of the back plate body,
  wherein the layered structure comprises a copper layer and a rubber layer covering the copper layer, and
  wherein the rubber layer is arranged directly on a back side of the copper layer and is adhered to the copper layer.

2. A disk brake system comprising a brake piston or a caliper finger and the brake pad assembly of claim 1, wherein the back side of the back plate contains a pressure region that is configured to be pushed on by the brake piston or by the caliper finger up-on brake application.

3. The disk brake system of claim 2, wherein the layered structure is arranged such that the brake piston or caliper finger is configured to push directly onto a back side of the layered structure upon brake application.

4. The disk brake system of claim 2, wherein the layered structure is arranged at least partly between the pressure region of the back side of the back plate and a top edge of the back side of the back plate, or
  wherein the layered structure is arranged at least partly between the pressure region of the back side of the back plate and at least one of a first side edge and a second side edge of the back side of the back plate.

5. The brake pad assembly of claim 1, wherein the back plate body comprises another recess on its back side, wherein the back plate further comprises another layered structure that is received within the other recess of the back plate body.

6. The brake pad assembly of claim 5, wherein the layered structure and the other layered structure are each arranged at least partly in a region of force transmission between a pressure region of the back side of the back plate that is configured to be pushed on by a brake piston or by a caliper finger upon brake application and an edge of the back side of the back plate.

7. The brake pad assembly of claim 1, wherein rubber layer forms a part of the back side of the back plate.

8. The brake pad assembly of claim 1, wherein the back plate body is made of steel.

9. The brake pad assembly of claim 1, wherein the copper layer has a thickness of at least 1 mm and at most 2.5 mm.

10. The brake pad assembly of claim 1, wherein the rubber layer has a thickness of at least 0.2 mm and at most 5 mm.

11. The brake pad assembly of claim 1, wherein the copper layer of the layered structure is cast into the recess of the back plate body.

12. The brake pad assembly of claim 1, wherein the copper layer has an enlarged thickness in a pressure region of the back side of the back plate that is configured to be pushed on by a brake piston or by a caliper finger.

13. The brake pad assembly of claim 1, wherein the copper layer has a copper content of at least 30% by weight.

* * * * *